United States Patent
Swart et al.

(10) Patent No.: US 6,693,372 B2
(45) Date of Patent: Feb. 17, 2004

(54) DATA TRANSMISSION SYSTEM, PARTICULARLY IN A MOTOR VEHICLE, AND DATA TRANSMISSION METHOD

(75) Inventors: Marten Swart, Obertraubling (DE); Christian Zelger, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 259 days.

(21) Appl. No.: 10/014,264

(22) Filed: Nov. 7, 2001

(65) Prior Publication Data

US 2002/0060892 A1 May 23, 2002

Related U.S. Application Data

(63) Continuation of application No. PCT/EP00/03475, filed on Apr. 17, 2000.

(30) Foreign Application Priority Data

May 7, 1999 (EP) .............................................. 99109098

(51) Int. Cl.[7] .............................................. H04L 12/40
(52) U.S. Cl. ...................... 307/125; 307/10.1; 714/43
(58) Field of Search .............................. 307/10.1, 125; 714/43, 56, 819

(56) References Cited

U.S. PATENT DOCUMENTS

| | | | | |
|---|---|---|---|---|
| 5,138,257 A | * | 8/1992 | Katsura | 714/43 |
| 5,448,180 A | * | 9/1995 | Kienzler et al. | 326/15 |
| 5,696,777 A | * | 12/1997 | Hofsaess | 714/820 |
| 5,765,031 A | * | 6/1998 | Mimuth et al. | 714/43 |
| 6,115,831 A | * | 9/2000 | Hanf et al. | 714/43 |

FOREIGN PATENT DOCUMENTS

| | | | | |
|---|---|---|---|---|
| DE | 4229175 | * | 3/1994 | H04L/12/40 |
| DE | 196 22 685 A1 | | 9/1997 | |
| EP | 0 725 513 A1 | | 8/1996 | |
| JP | 2002-314554 | * | 10/2002 | H04L/12/40 |
| WO | WO 92/17017 | | 10/1992 | |
| WO | WO 00/77977 | * | 12/2000 | H04L/12/00 |

OTHER PUBLICATIONS

"Bus Contention and Overload Detecting Transmitter", IBM Technical Disclosure Bulletin, vol. 34, No. 8, Jan. 1992, pp. 10–13.

* cited by examiner

*Primary Examiner*—Brian Sircus
*Assistant Examiner*—Roberto J. Rios
(74) *Attorney, Agent, or Firm*—Laurence A. Greenberg; Werner H. Stemer; Ralph E. Locher

(57) ABSTRACT

To improve the protection against short circuits, a method for transmitting data and a data transmission system including switching over the line polarity of a two-wire bus, after a line short circuit has been detected, such that data transmission can still be continued. In addition, a line potential check is performed and, in dependence thereon, a decision is made as to whether or not an overloaded driver remains permanently switched off.

27 Claims, 3 Drawing Sheets

DATA TRANSMISSION SYSTEM, PARTICULARLY IN A MOTOR VEHICLE, AND DATA TRANSMISSION METHOD

CROSS-REFERENCE TO RELATED APPLICATION

This application is a continuation of copending International Application No. PCT/EP00/03475, filed Apr. 17, 2000, which designated the United States.

BACKGROUND OF THE INVENTION

Field of the Invention

The invention relates to a data transmission system including two or more data processing units that are connected to one another through a bus having two lines. Furthermore, the invention is directed to a data transmission method.

German Published, Non-Prosecuted Patent Application DE 196 22 685 A1, corresponding to U.S. Pat. No. 6,052, 635 to Swart et al., discloses a data transmission system having at least two data processing units that are connected to one another through a bus having two lines and used in a passenger protection system of a motor vehicle. In the Swart system, a control device is connected to an ignition driver circuit through a bus having two lines. Between the two bus lines, a direct voltage is present for supplying the ignition driver circuit with voltage on which is modulated the data signal transmitted by amplitude modulation.

In general, such data transmission systems are at risk from short circuits because the data transmission can no longer be reliably guaranteed should one of the bus lines come into conductive contact with a component that is at a fixed potential, for example, with ground potential, on-board voltage, or another fixed potential as a result of a fault. Such conductive contacting can occur due to vibrations that occur strongly in the motor vehicle, whirring-through, or defectiveness of the insulation etc. In such a case, it is not only the data transmission that can be impaired in a safety-critical manner but possibly also the bus driver or drivers can be damaged due to the high short circuit current that can interfere with or render impossible any subsequent data communication after the short circuit has been eliminated or has disappeared. In such a case, the driver also needs to be exchanged.

SUMMARY OF THE INVENTION

It is accordingly an object of the invention to provide a data transmission system, particularly, in a motor vehicle, and a data transmission method, that overcomes the hereinafore-mentioned disadvantages of the heretofore-known methods and devices of this general type and that has improved short-circuit resistance.

With the foregoing and other objects in view, there is provided, in accordance with the invention, a data transmission system including a bus having two lines with different nominal potentials applied to the two lines at least during data transmission, at least two data processing units connected to one another through the bus, a controller generating data modulated onto at least one of the nominal potentials as modulation signals, at least one driver for generating the modulation signals to be transmitted, the at least one driver connected to the two lines, and a short-circuit detector device for detecting a short circuit of one of the two lines, the short-circuit detector device applying a nominal potential originally provided for a short-circuited one of the two lines to another one of the two lines not short-circuited dependent upon a detection of a short circuit.

In the invention, the occurrence of a short circuit of one or both bus lines is actively checked and when short circuit currents or voltages occur, corresponding counter measures are initiated. Preferably, the nominal potentials of the two bus lines are switched over after a short circuit has been detected so that, for example, the line previously carrying positive potential is now at zero potential or low potential and the line previously at zero potential or low potential is switched over to the high potential. If, for example, the bus line previously at high potential shows a short circuit to ground or a low potential value, the switching over of the bus line potentials can have the effect that essentially the same difference voltage between the bus lines is received at the receiver end and the configuration amplitude modulation percentage can be essentially retained in the data transmission. Such occurs because the bus line that was previously at or near zero potential assumes a high potential after the polarity switch-over so that the potential difference with respect to the other bus line that is short circuited to ground potential or low potential largely remains guaranteed. The polarity switch-over of the two bus lines in the case of a short circuit can make it possible not only to retain reliable data transmission but, if necessary, also allow continuous voltage feeding to be maintained if the bus lines are used not only for data transmission but also for direct-current feeding of the connected data processing units (see e.g., Swart).

In accordance with another feature of the invention, there is provided a short-circuit detector device exchanging the nominal potentials of the two lines with one another dependent upon the detection of the short circuit.

In accordance with a further feature of the invention, the short-circuit detector device switches off one of the drivers associated with the short-circuited one of the two lines dependent upon the detection of the short circuit. When a short circuit is detected, the driver of the short-circuited bus line can also be disabled, if necessary, so that overloading and damage to the driver due to excessive short-circuit currents is avoided.

In accordance with an added feature of the invention, there is provided a short-circuit detector device for detecting a short circuit of one of the two lines, the short-circuit detector device amplifying a swing of the modulation signals on one of the two lines not short-circuited dependent upon a detection of a short circuit.

In accordance with an additional feature of the invention, the at least one driver is two drivers respectively connected to the two lines, and the control device controls, after a switch-off of a first of two drivers due to a short circuit, a second of the two drivers such that the second driver impresses a voltage change of twice an amplitude of an undisturbed case of the modulation signals on a respective one of the two lines associated with the second driver for data transmission.

In accordance with yet another feature of the invention, the controller generates data modulated onto only one of the nominal potentials as modulation signals, at least one driver connected to the two lines generates the modulation signals to be transmitted, and a short-circuit detector device detects a short circuit of one of the two lines, the short-circuit detector device modulating modulation signals onto the nominal potential of another of the two lines dependent upon a detection of a short circuit of the one of the two lines transmitting the modulation signals.

In accordance with yet a further feature of the invention, at least one driver is two drivers respectively connected to the two lines, a line voltage detection device checks a potential of a short-circuited one of the two lines, and the controller controls, dependent upon a line voltage, at least one of a switch-over of the nominal potentials and a switching-off of at least one of the two drivers.

In accordance with yet an added feature of the invention, the line voltage detection device checks a potential of the two lines.

In accordance with yet an additional feature of the invention, the at least one driver is two drivers operating synchronously in an undisturbed case and respectively providing half an amplitude modulation swing and each of the two lines is connected to one of the two drivers.

In accordance with again another feature of the invention, at least one of the at least two data processing units evaluates a voltage difference between the two lines for data detection.

With the objects of the invention in view, there is also provided a method for transmitting data in a data transmission system having at least two data processing units coupled to one another through a bus having two lines carrying modulation signals and drivers connected to the bus, including the steps of applying different nominal potentials to each of the two lines at least during data transmission, checking the two lines with regard to an occurrence of a short circuit, and applying, in a case of a short circuit of one of the two lines, a nominal potential originally provided for the short-circuited line to another of the two lines not short-circuited.

In accordance with again a further mode of the invention, the nominal potentials of the lines are exchanged with one another in the case of a short circuit.

In accordance with again an added mode of the invention, a driver associated with the short-circuited line is switched off in the case of a short circuit.

In accordance with again an additional mode of the invention, whether or not one of the drivers is operating in a current-limiting mode is checked and, if so, the one driver is switched off and the potential existing on one of the two lines associated with the one driver is subsequently checked.

In accordance with still another mode of the invention, the potential existing on the other one of the two lines is checked.

In accordance with still a further mode of the invention, the one driver is kept switched off if the potential of the one line associated with the one driver or the potential of the other of the two lines deviates from a nominal potential of the respective line by less than a given value, preferably, by less than 50%.

In accordance with still an added mode of the invention, another switch-over of a polarity of the bus is prevented after the polarity of the bus has been switched over once and the short-circuit current still occurs.

In accordance with still an additional mode of the invention, after the driver has been switched off, a driver still operating is controlled to generate a voltage change swing of twice a magnitude of an undisturbed case of the modulation signals on a respective one of the two lines.

With the objects of the invention in view, there is also provided a method for transmitting data in a data transmission system having at least two data processing units coupled to one another through a bus having two lines carrying modulation signals and drivers connected to the bus, including the steps of applying different nominal potentials to the two lines at least during data transmission, modulating the modulation signals onto at least one of the nominal potentials, checking the two lines with regard to an occurrence of a short circuit, and increasing a swing of the modulation signals on one of the two lines not short-circuited in a case of the short circuit.

In accordance with still another mode of the invention the swing of the modulation signals is doubled.

With the objects of the invention in view, there is also provided a method for transmitting data in a data transmission system having at least two data processing units coupled to one another through a bus having two lines carrying modulation signals and drivers connected to the bus, including the steps of applying different nominal potentials to the two lines at least during data transmission, modulating the modulation signals onto only one of the nominal potentials of one of the two lines, checking the two lines with regard to an occurrence of a short circuit, and in a case of the short circuit of the one line transmitting the modulation signals, modulating the modulation signals onto the nominal potential of the other one of the two lines.

The data transmission system according to the invention can be constructed such that in the short-circuit-free case, only one of the bus lines is subjected to amplitude modulation for data transmission whereas the other bus line remains at a constant potential. It is only after a short circuit occurs on the previously amplitude-modulated bus line, that switching-over to the other bus line for amplitude modulation would occur. Preferably, however, the bus driver system is configured to be balanced and synchronously modulates the nominal line voltages of, for example, +10 V and 0 V so that the intended modulation amplitude change is equally distributed to both lines. Should the amplitude modulation be configured with a modulation percentage of 50%, one line is switched over, for example, between +10 V and +7.5 V whereas the other line is switched between 0 V and +2.5 V synchronously thereto. Thus, the receiver sees difference voltage fluctuations of 10 V and 5 V between the two bus lines. In such a system, if one of the two line drivers must be switched off because of a short circuit of the associated bus line, the driver of the other functioning bus line is preferably switched over such that it now generates twice the voltage swing. If, for example, the +10 V bus line is short circuited to ground, it is not only the other bus line that is switched from previously 0 V to +10 V but the driver is also driven such that it performs an amplitude modulation of between +10 V and +5 V. The receiver thus receives the same amplitude modulation percentage as in the undisturbed case. The effect improves the data transmission reliability even further. The doubling of the amplitude swing of the one driver after disabling the driver of the other bus line can also be provided in a case in which no previous potential switch-over of the bus line potentials has taken place. Such can be the case if, for example, the bus line previously operated at the nominal potential of 0 V should experience a permanent short circuit to ground. In such a case, naturally, the potential switch-over does not take place but the amplitude swing of the drivers of the other bus line that is at a high level is still preferably doubled.

The data transmission system described can be generally used for data transmission of any type of data and in any systems but is preferably used in the motor vehicle field, for example, in a motor vehicle passenger protection system for transmitting data between a central control device and sensors and/or igniter driver circuits, or in an immobilizer control system or the like.

Other features that are considered as characteristic for the invention are set forth in the appended claims.

Although the invention is illustrated and described herein as embodied in a data transmission system, particularly, in a motor vehicle, and a data transmission method, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
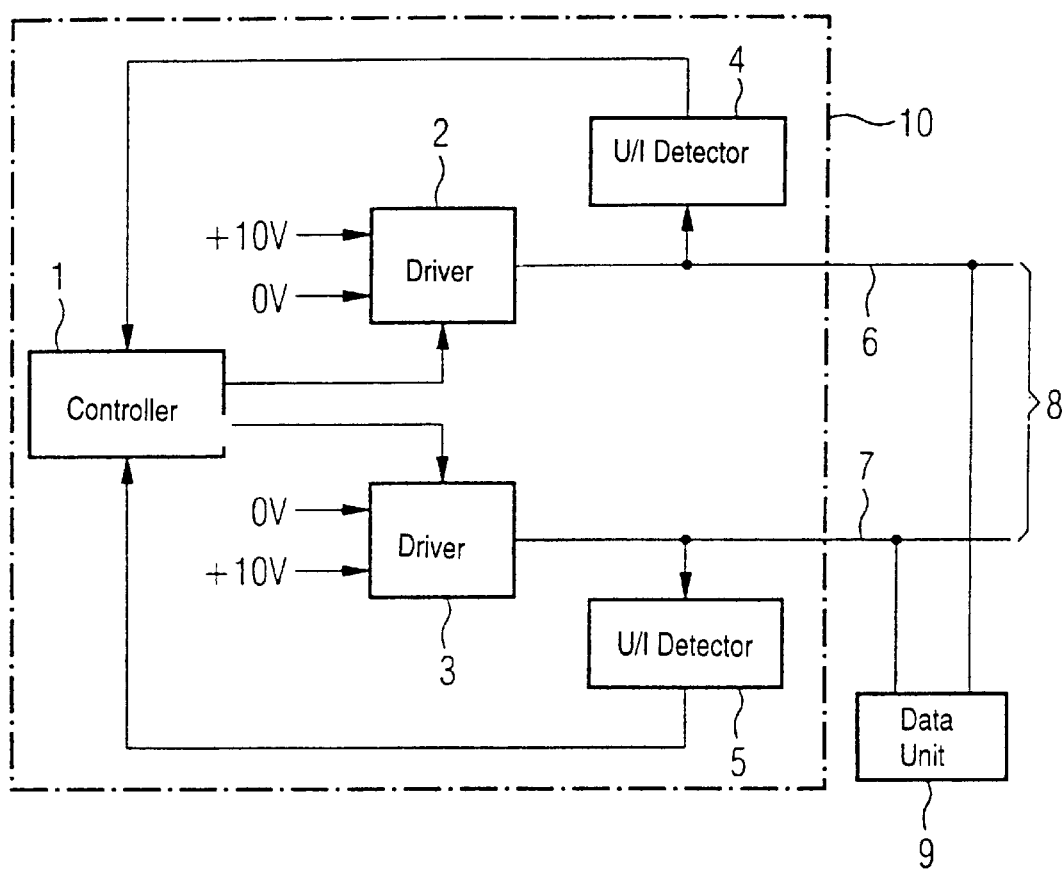
FIG. 1 is a circuit block diagram of a data transmission system according to the invention.

Referring now to the figures of the drawings in detail and first, particularly to FIG. 1 thereof, there is shown a control device 10 that can be, for example, the central control device of a motor vehicle passenger protection system and includes a control device 1 and two bus drivers 2, 3 controlled by the control device 1. Each driver 2 and 3 is provided for one of the lines 6, 7 of a two-wire bus 8 and controls the potential on the associated line 6, 7 for data transmission and possibly also for supplying a further data transmission or data processing unit 9 (which is connected to the two lines 6, 7 of the bus 8 through two lines or terminals) with direct current. The line 6 is connected to a detector 4 (U/I detector) that detects the potential of the line 6 and/or the current flowing in. In a similar manner, a detector 5 (U/I detector) is connected to the line 7 for detecting its potential and/or current flow. The outputs of the detectors 4 and 5 are applied to inputs of the control device 1 through lines so that the control device 1 can monitor the voltage and/or the current of the lines 6 and 7.

In the simplest case, the detectors 4 and 5 are constructed as mere short-circuit current detectors that compare the current currently flowing with a reference value signaling a short circuit and when the reference value is reached or exceeded, apply a signal signaling the excess current to the control device 1. Such a configuration greatly relieves the control device 1 because the control device 1 does not need to perform its own current analysis. The detectors 4 and 5, however, preferably also additionally detect the current potential value of the lines 6 and 7 so that the control device 1 can also detect the occurrence of short circuits due to unexpected potential changes. In the undisturbed case, the driver 2 traces the line 6 at high potential value of, for example, +10 V at least during the data transmission but possibly also continuously during the switched-on operating state. In the undisturbed case, the driver 2 normally places the line 7 on a potential value deviating from the potential of the line 6, for example, 0 V so that a difference voltage of 10 V is present on the bus. The difference voltage is modulated for the data transmission. For such a purpose, the driver 2 switches the potential of the line 6 at the rate of the zeros and ones to be transmitted and in dependence on the selected type of coding between the normal potential +10 V and a lower potential value of, for example, +7.5 V. Symmetrically and synchronously thereto, the driver 3 also varies the potential of the line 7 between the potential values of 0 and +2.5 V. The difference voltage is, thus, switched between +5 V and +10 V at the rate of the data to be transmitted. These changes in difference voltage are detected and evaluated by the data processing unit 9. As a rule, other data processing units are also connected to the bus 8, which are then selected through their address. In the case of bidirectional communication, the data processing unit 9 is also provided with drivers for modulating the bus voltage. In such a case, the control device 10 is then equipped with a corresponding evaluating circuit connected to the lines 6 and 7.

As can be seen from FIG. 1, the input voltages +10 V and 0 V (or other suitable values) are applied respectively to the two drivers so that driver 2 can switch from the nominal potential of 10 V to 0 V in the case of a fault and in the same manner driver 3 can change from the nominal potential of 0 V to the nominal potential of 10 V. Thus, the voltage polarity of the voltage on lines 6 and 7 can be switched over. After such a switch-over, the driver 2 then modulates line 6 between potential values 0 V and +2.5 V for the data transmission whereas driver 3 subjects line 7 to an amplitude modulation of between +10 V and +7.5 V. The difference voltage occurring on the bus is, therefore, still modulated between 5 V and 10 V even after such a switch-over, the only difference being that line 7 is now more positive than line 6. The switch-over takes place after certain types of short circuits have been detected, which will be explained in greater detail in the text that follows. Instead of feeding drivers 2 and 3 respectively with the nominal values of +10 V and 0 V at the input, as an alternative, only the connections of drivers 2 and 3 to lines 6 and 7 can be switched over in the short-circuit case so that driver 2 then modulates line 7 between +10 V and +7.5 V whereas driver 3 is connected to line 6 and modulates line 6 between 0 V and +2.5 V. In such a case, feeding driver 2 with "0 V" can likewise be omitted, as can feeding driver 3 with "+10 V".

As an alternative, the two drivers 2 and 3 can also be provided respectively with two separate driver segments for +10 V and 0 V of which in each case only one is activated, control device 1 determining the switch-over between the two driver sections through its control lines connected to drivers 2 and 3. In such a case, there are actually four drivers, of which in each case only two or, if necessary, only one in the case of a complete disconnection of the drivers for the other bus line, are active. The voltage values 0 V, 2.5 V, 7.5 V, and 10 V specified above are only examples and can also have other values depending on the conditions present.

Furthermore, it is also possible to modulate the voltage amplitude on only one bus line, for example, line 6, for the data transmission. After a short circuit of bus line 6 has been detected, it is then possible to switch over to the modulation of the other line 7 so that the data transmission can still be continued.

Figure 2:
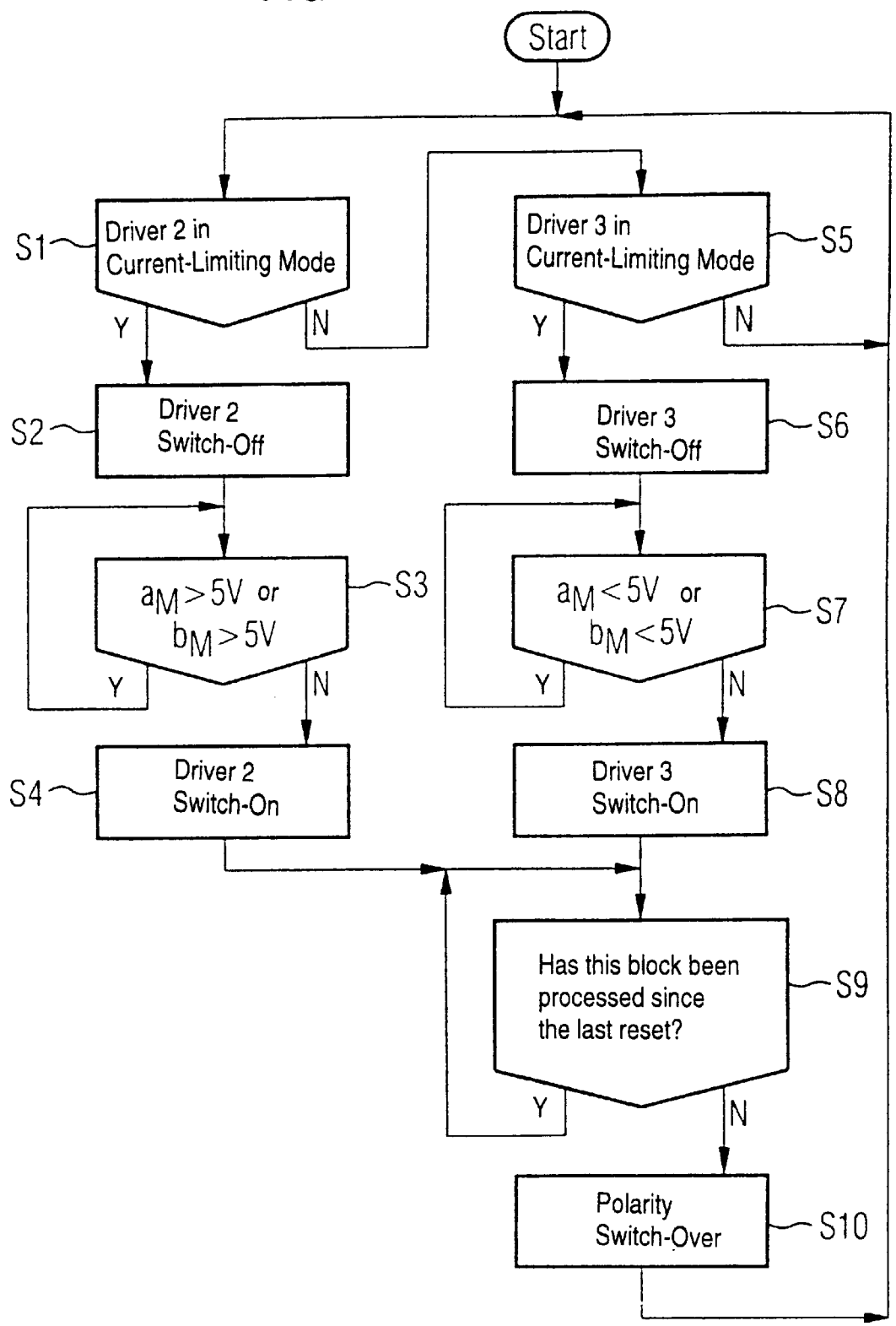
FIG. 2 is a flowchart illustrating the operation of the data transmission system according to the invention.

Referring to FIG. 2, the operation of the data transmission will be described in the text that follows. After the program routine has started, a check is made in a step S1 whether or not driver 2 is operating in current limiting mode, i.e., a short-circuit current is flowing. The check is detected through detector 4 that outputs a corresponding message to the control device 1.

If necessary, the short circuit current can also be detected directly in the control device 1. For example, the current limiting can be set to 150 mA whereas the maximum current flow will not rise above, for example, 100 mA when the system is operating correctly. A stronger current flow than such a value is, thus, a sign of a short circuit of line 6 to another potential that can be, for example, the ground potential of the vehicle chassis. However, short circuits to components, for example, lines, which are at another potential are also possible. If driver 2 is in current limiting mode, it will be switched off in a step S2 so that the potential of line 6 drops to 0 V in the undisturbed case.

The control device 1 then checks in a step S3 whether or not the voltage $a_M$ of line 6 is greater than 5 V, i.e., greater than half the normal voltage difference between lines 6 and 7. In addition, the potential $b_M$ of line 7 is also checked as to whether or not it is greater than 5 V. The latter check is performed to be able to decide whether or not a polarity change of the bus lines is merited or not. Such a decision is necessary because, if the potential $b_M$ of line 7 should also be above 5 V, a polarity switch-over will not lead to any or to no significant improvement in the overall situation. Should the potentials $a_M$ and/or $b_M$ be greater than 5 V, the step S3 is cyclically repeated so that driver 2 remains switched off. If, however, the response is NO in step S3, the program changes to step S4 in which driver 2 is switched on again and then changes to a step S9 in which a check is made as to whether or not the block has been passed through previously since the last reset performed, for example, manually or on system switch-on. If such is the case, step S9 is repeated a number of times so that the system is in the wait state. The step S9 is used for preventing a cyclic polarity change in accordance with the explanation below if the short-circuit problem cannot be solved by the polarity change. If necessary, however, step S9 can also be omitted so that the process changes directly to step S10 after step S4. If the response in step S9 is "NO", the polarity of the bus 8 is switched over in step S10, i.e., the nominal potential values of lines 6 and 7 are exchanged. In the process, driver 2 is switched over by the control device 1 such that it applies the 0 V potential to bus line 6 that is then switched over between 0 V and +2.5 V in the case of data to be transmitted. Conversely, driver 3 is switched over by the control device 1 such that it then switches the line 7 to the nominal potential of +10 V, possibly amplitude modulated to +7.5 V.

After the polarity switch-over of bus 8, the process jumps back to step S1 and again checks whether driver 2 is still in current limiting mode or not. If the response to step S1 is "NO", the process changes to step S5 in which driver 3 is then checked for a short circuit of the associated bus line 7. For such a purpose, the current flowing in line 7 is interrogated by the detector 5 and the corresponding result or the current value currently measured is reported to the control device 1. If there is no short circuit, i.e., driver 3 is not operating in current limiting mode, the process changes back to step S1 so that steps S1 and S5 are cyclically repeated.

If, in contrast, however, driver 3 is in current-limiting mode, the process changes to step S6 in which driver 3 is switched off. After that, a check is made in step S7 whether or not the potential $a_M$ of line 6 and/or the potential $b_M$ of line 7 is respectively below 5 V. The check is done by interrogating the voltages on lines 6 and 7 by detectors 4 and 5 and reporting to the control device 1 or by direct potential measurement by the control device 1 in the same manner as in step S3. If one or both potentials $a_M$ or $b_M$ are below 5 V, the system runs through step S7 in a wait loop so that driver 3 remains switched off because a polarity change does not promise an improvement in the situation. If, however, the response in step S7 is NO, driver 3 is switched on again in step S8 and the process then runs block S9. If the process has changed directly to step S5 from step S1 without previous polarity change, it then changes from step S9 to step S10, i.e., switches over the bus polarity.

The system of the invention is, thus, capable of responding differently, i.e., in dependence on potential, to short circuits of one of bus lines 6 and 7 depending on the type of short circuit, namely with switching the polarity of the bus line and/or disconnecting one of drivers 2 or 3. The process is summarized in the text that follows.

If line 6 provided for a nominal level of 10 V is short circuited to a voltage between 5 V and 10 V, driver 2 is switched off in step S3 and then remains switched off. If line 6 is short circuited to a voltage between 0 V and 5 V, the polarity is switched over in step S10 and then driver 3 is switched off and kept switched off in step S6, S7. If line 6 is short circuited to ground, the polarity is switched over in step S10 after which the system can then again perform a correct data transmission and drivers 2 and 3, thus, remain switched on.

If line 7 should be short circuited to a voltage of more than 10 V, the polarity is switched over in step S10. If line 7 is short circuited to a voltage between 5 V and 10 V, the polarity is switched over and then driver 2 is switched off (previously, driver 3 was switched off in step S5 and then switched on again in step S8 and then remains switched on). If line 7 is short circuited to a voltage of <5 V, driver 3 is switched off and then remains switched off. Previously, "hard" short circuits to fixed potentials have been discussed. However, the system can also respond to "soft" short circuits in which only a current that is too high is flowing, without the potentials of lines 6 and 7 deviating too greatly from their nominal values. If line 6 has a leakage flow to ground that, for example, attains a value of 150 mA, driver 2 passes into current saturation that is detected through detector 4 and the control device 1 and leads to the polarity being switched over (step S10). In the same manner, the polarity is switched over if line 7 should have a leakage flow to the battery voltage or any other high voltage.

Figure 3:
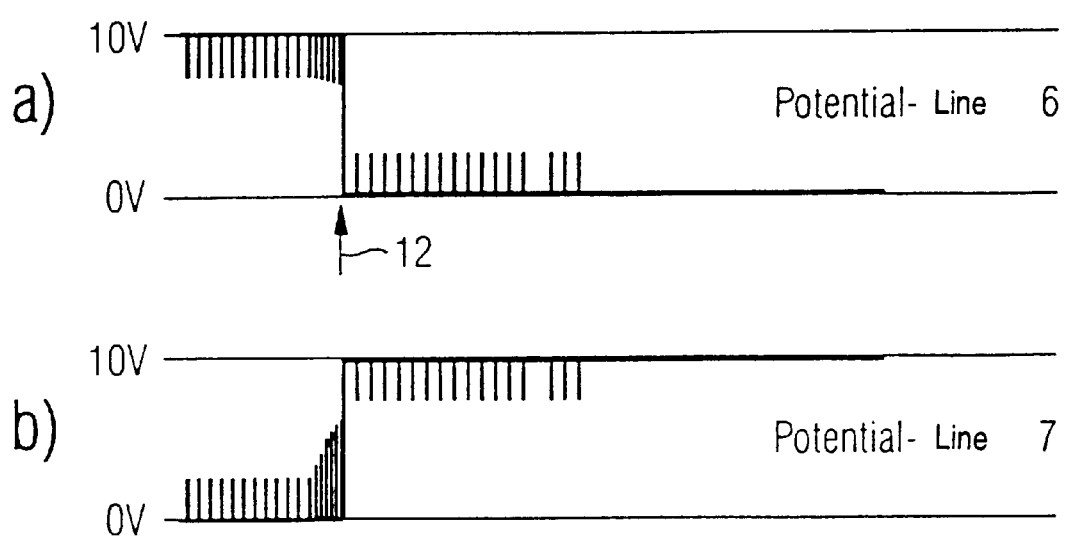
FIG. 3 is a signal timing diagram illustrating signal variations occurring on two bus lines according to the invention.

FIG. 3 shows the variation of the potentials on lines 6 and 7. Before a time 12, line 6 is at the high potential of 10 V, the spike-shaped points illustrating the amplitude modulation between 10 V and 7.5 V performed for the data transmission. As shown in FIG. 3 (trace b), the potential of line 7 is at 0 V and is amplitude modulated (between 0 V and 2.5 V) synchronously and symmetrically to the potential of line 6. Shortly before time 12, however, line 7 is short circuited to a potential between 5 V and 10 V. The short circuit leads to driver 3 being overloaded and, thus, after steps S5 to S9 have been passed, to a polarity switch-over at time 12. After time 12, the data transmission is, thus, performed with reverse bus polarity. If no further correct amplitude modulation should be possible on line 7 due to a short circuit, amplitude modulation still takes place through line 6 and correct data transmission is, thus, ensured. The control device 1 can also be configured such that, after a line short circuit has been found and, thus, the line is eliminated for amplitude modulation, it drives the driver of the other undisturbed line (if necessary after polarity reversal), such that it generates twice the amplitude swing of, for example, 5 V so that the same change in difference voltage as in the short-circuit-free case is detected at the receiver end.

We claim:

1. A data transmission system comprising:
   a bus having two lines with different nominal potentials applied to said two lines at least during data transmission;

at least two data processing units connected to one another through said bus;

a controller generating data modulated onto at least one of the nominal potentials as modulation signals;

at least one driver for generating the modulation signals to be transmitted, said at least one driver connected to said two lines; and a short-circuit detector device for detecting a short circuit of one of said two lines, said short-circuit detector device applying a nominal potential originally provided for a short-circuited one of said two lines to another one of said two lines not short-circuited dependent upon a detection of a short circuit.

2. The data transmission system according to claim 1, wherein said short-circuit detector device exchanges the nominal potentials of said two lines with one another dependent upon the detection of the short circuit.

3. The data transmission system according to claim 1, wherein:

said at least one driver is two drivers respectively connected to said two lines; and said short-circuit detector device switches off one of said drivers associated with said short-circuited one of said two lines dependent upon the detection of the short circuit.

4. A data transmission system comprising:

a bus having two lines with different nominal potentials applied to said two lines at least during data transmission;

at least two data processing units connected to one another through said bus;

a controller generating data modulated onto at least one of the nominal potentials as modulation signals;

at least one driver for generating the modulation signals to be transmitted, said at least one driver connected to said two lines; and a short-circuit detector device for detecting a short circuit of one of said two lines, said short-circuit detector device amplifying a swing of the modulation signals on one of said two lines not short-circuited dependent upon a detection of a short circuit.

5. The data transmission system according to claim 4, wherein:

said at least one driver is two drivers respectively connected to said two lines; and said control device controls, after a switch-off of a first of said two drivers due to a short circuit, a second of said two drivers such that said second driver impresses a voltage change of twice an amplitude of an undisturbed case of the modulation signals on a respective one of said two lines associated with said second driver for data transmission.

6. A data transmission system comprising:

a bus having two lines with different nominal potentials applied to said two lines at least during data transmission;

at least two data processing units connected to one another through said bus;

a controller generating data modulated onto only one of the nominal potentials as modulation signals;

at least one driver for generating the modulation signals to be transmitted, said at least one driver connected to said two lines; and a short-circuit detector device for detecting a short circuit of one of said two lines, said short-circuit detector device modulating modulation signals onto the nominal potential of another of said two lines dependent upon a detection of a short circuit of said one of said two lines transmitting the modulation signals.

7. The data transmission system according to claim 1, wherein:

said at least one driver is two drivers respectively connected to said two lines;

a line voltage detection device checks a potential of a short-circuited one of said two lines; and said controller controls, dependent upon a line voltage, at least one of:
a switch-over of the nominal potentials; and
a switching-off of at least one of said two drivers.

8. The data transmission system according to claim 7, wherein said line voltage detection device checks a potential of said two lines.

9. The data transmission system according to claim 4, wherein:

said at least one driver is two drivers respectively connected to said two lines;

a line voltage detection device checks a potential of a short-circuited one of said two lines; and said controller controls, dependent upon a line voltage, at least one of:
a switch-over of the nominal potentials; and
a switching-off of at least one of said two drivers.

10. The data transmission system according to claim 9, wherein said line voltage detection device checks a potential of said two lines.

11. The data transmission system according to claim 6, wherein:

said at least one driver is two drivers respectively connected to said two lines;

a line voltage detection device checks a potential of a short-circuited one of said two lines; and said controller controls, dependent upon a line voltage, at least one of:
a switch-over of the nominal potentials; and
a switching-off of at least one of said two drivers.

12. The data transmission system according to claim 11, wherein said line voltage detection device checks a potential of said two lines.

13. The data transmission system according to claim 1, wherein:

said at least one driver is two drivers operating synchronously in an undisturbed case and respectively providing half an amplitude modulation swing; and each of said two lines is connected to one of said two drivers.

14. The data transmission system according to claim 1, wherein at least one of said at least two data processing units evaluates a voltage difference between said two lines for data detection.

15. A method for transmitting data in a data transmission system having at least two data processing units coupled to one another through a bus having two lines carrying modulation signals and drivers connected to the bus, which comprises:

applying different nominal potentials to each of the two lines at least during data transmission;

checking the two lines with regard to an occurrence of a short circuit; and applying, in a case of a short circuit of one of the two lines, a nominal potential originally provided for the short-circuited line to another of the two lines not short-circuited.

16. The data transmission method according to claim 15, which further comprises exchanging the nominal potentials of the lines with one another in the case of a short circuit.

17. The data transmission method according to claim 15, which further comprises switching off a driver associated with the short-circuited line in the case of a short circuit.

18. The data transmission method according to claim 15, which further comprises checking whether or not one of the drivers is operating in a current-limiting mode and, if so, switching off the one driver and subsequently checking the potential existing on one of the two lines associated with the one driver.

19. The data transmission method according to claim 18, which further comprises checking the potential existing on the other one of the two lines.

20. The data transmission method according to claim 18, which further comprises keeping the one driver switched off if the potential of the one line associated with the one driver or the potential of the other of the two lines deviates from a nominal potential of the respective line by less than a given value.

21. The data transmission method according to claim 18, which further comprises keeping the one driver switched off if the potential of the one line associated with the one driver or the potential of the other of the two lines deviates from a nominal potential of the respective line by less than 50%.

22. The data transmission method according to claim 18, which further comprises preventing another switch-over of a polarity of the bus after the polarity of the bus has been switched over once and the short-circuit still occurs.

23. The data transmission method according to claim 18, which further comprises preventing another switch-over of a polarity of the bus after the polarity of the bus has been switched over once and the short-circuit current still occurs.

24. The method according to claim 17, which further comprises, after the driver has been switched off, controlling a driver still operating to generate a voltage change swing of twice a magnitude of an undisturbed case of the modulation signals on a respective one of the two lines.

25. A method for transmitting data in a data transmission system having at least two data processing units coupled to one another through a bus having two lines carrying modulation signals and drivers connected to the bus, which comprises:

applying different nominal potentials to the two lines at least during data transmission;

modulating the modulation signals onto at least one of the nominal potentials;

checking the two lines with regard to an occurrence of a short circuit; and increasing a swing of the modulation signals on one of the two lines not short-circuited in a case of the short circuit.

26. The data transmission method according to claim 25, which further comprises doubling the swing of the modulation signals.

27. A method for transmitting data in a data transmission system having at least two data processing units coupled to one another through a bus having two lines carrying modulation signals and drivers connected to the bus, which comprises:

applying different nominal potentials to the two lines at least during data transmission;

modulating the modulation signals onto only one of the nominal potentials of one of the two lines;

checking the two lines with regard to an occurrence of a short circuit; and in a case of the short circuit of the one line transmitting the modulation signals, modulating the modulation signals onto the nominal potential of the other one of the two lines.

* * * * *